United States Patent
Chauvelier

(10) Patent No.: US 9,827,869 B2
(45) Date of Patent: Nov. 28, 2017

(54) POWER SUPPLY SYSTEM AND METHOD FOR AN ELECTRIC VEHICLE

(71) Applicant: RENAULT s.a.s., Boulogne-Billancourt (FR)

(72) Inventor: Eric Chauvelier, Le Mesnil Saint Denis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 287 days.

(21) Appl. No.: 14/430,111

(22) PCT Filed: Jul. 31, 2013

(86) PCT No.: PCT/FR2013/051853
§ 371 (c)(1),
(2) Date: Mar. 20, 2015

(87) PCT Pub. No.: WO2014/057181
PCT Pub. Date: Apr. 17, 2014

(65) Prior Publication Data
US 2015/0251559 A1  Sep. 10, 2015

(30) Foreign Application Priority Data

Sep. 20, 2012 (FR) .................................. 12 58840

(51) Int. Cl.
*B60L 1/00* (2006.01)
*B60L 11/18* (2006.01)
*H02J 7/00* (2006.01)

(52) U.S. Cl.
CPC ............. *B60L 11/1868* (2013.01); *B60L 1/00* (2013.01); *B60L 11/1816* (2013.01);
(Continued)

(58) Field of Classification Search
CPC .............. B60L 11/1868; B60L 11/1816; B60L 11/1838; B60L 11/1861; B60L 11/1862
(Continued)

(56) References Cited

U.S. PATENT DOCUMENTS 5,793,189 A * 8/1998 Kawaguchi ......... B60L 11/1859
320/125
2005/0285564 A1* 12/2005 Mathews ............ B60L 11/1861
320/116
(Continued)

FOREIGN PATENT DOCUMENTS

DE  10 2011 012 316  6/2012
FR  2 925 237  6/2009

OTHER PUBLICATIONS

French Search Report dated May 17, 2013 in French Patent Application No. 1258840 Filed Sep. 20, 2012.
(Continued)

*Primary Examiner* — Thomas Skibinski
(74) *Attorney, Agent, or Firm* — Oblon, McClelland, Maier & Neustadt, L.L.P.

(57) ABSTRACT

An electric power supply system for an electric vehicle, including a low-voltage network powering auxiliary devices of the vehicle and a high-voltage network powering a propulsion mechanism of the vehicle. The low-voltage network includes a low-voltage battery storing electric energy and a first converter connected to the high-voltage network powering the low-voltage network, while the high-voltage network includes a high-voltage battery and a switching mechanism isolating the high-voltage battery. The system further includes a first supervisor controlling the switching mechanism and a first monitoring mechanism determining if the charge of the low-voltage battery is below or above a first threshold, the supervisor configured to control the switching
(Continued)

mechanism to connect the high-voltage battery if the first monitoring mechanism indicates the battery charge is below the first threshold.

9 Claims, 1 Drawing Sheet

(52) U.S. Cl.
CPC ....... *B60L 11/1838* (2013.01); *B60L 11/1861* (2013.01); *B60L 11/1862* (2013.01); *H02J 7/0054* (2013.01); *B60L 2210/12* (2013.01); *B60L 2240/547* (2013.01); *B60L 2240/549* (2013.01); *Y02T 10/7005* (2013.01); *Y02T 10/7044* (2013.01); *Y02T 10/7066* (2013.01); *Y02T 10/7072* (2013.01); *Y02T 10/7233* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
USPC ..... 307/9.1, 10.1, 10.6, 10.7, 10.8; 320/103, 320/104, 134–140, 149, 162–164, 125, 320/127, 128
See application file for complete search history.

(56) References Cited

U.S. PATENT DOCUMENTS

2006/0038532 A1    2/2006  Taniguchi
2010/0244782 A1*   9/2010  Nagayama .......... B60L 11/1868
                                                          320/162

OTHER PUBLICATIONS

International Search Report dated Jan. 26, 2015 in PCT/FR2013/051853 Filed Jul. 31, 2013.

* cited by examiner

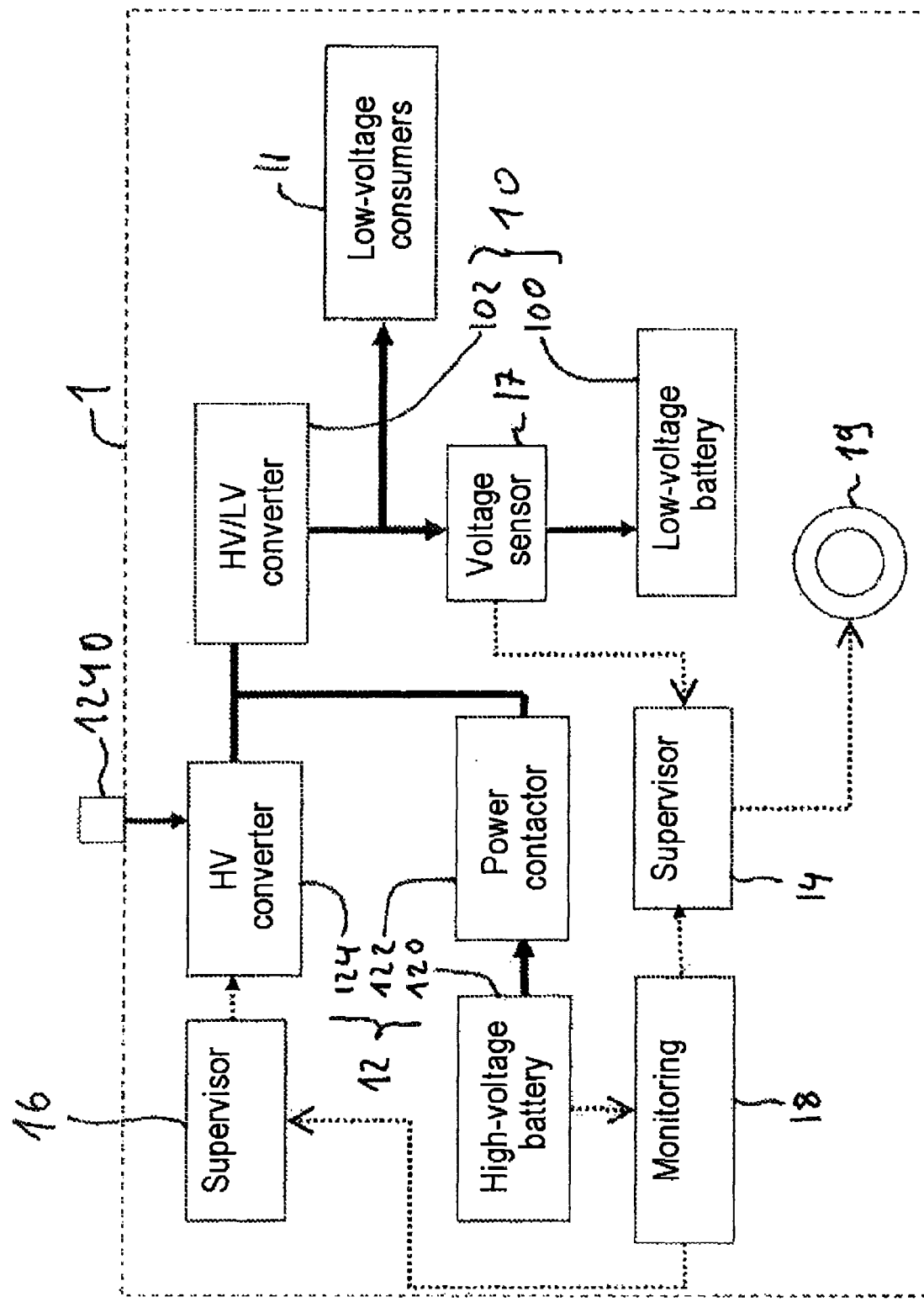

POWER SUPPLY SYSTEM AND METHOD FOR AN ELECTRIC VEHICLE

TECHNICAL FIELD

The present invention relates to an electric power supply system for an electric vehicle, of the type comprising a low-voltage network for powering the auxiliary devices of the vehicle and a high-voltage network for powering the propulsion means of the vehicle.

PRIOR ART

An electric vehicle generally comprises an electric power supply system with two separate networks: a high-voltage network dedicated to propelling the vehicle, for powering motors, and a low-voltage network for powering the auxiliary devices such as the air conditioning of the vehicle, lighting, signaling functions, and computers. Each network is equipped with a battery pack in order to provide the necessary energy.

Recharging means are provided in order to recharge the batteries from an external electric power supply, for example from a home network. Different configurations are possible, including an arrangement in which a first converter powers the low-voltage network from the high-voltage network and a second converter powers the high-voltage network from the home network. The high-voltage battery is connected to the high-voltage network via switching means, such as a contactor, in order to isolate the battery when it is not being used. By contrast, the battery is connected when the driver of the vehicle starts up the vehicle so as to be ready for use, or when the high-voltage battery is being charged by the home network. After complete recharging by the home network, the second converter enters into a state of rest and disconnects from the high-voltage network.

When the vehicle is not being used, it is in a dormant state, in which the high-voltage battery is disconnected and the computers are in a standby mode. The consumption of the computers across the low-voltage network in standby mode is very reduced, but is not zero.

When the vehicle is stored for a long time without leaving the dormant mode, the battery of the low-voltage network is used up by being discharged. This may occur when the vehicle is stored after leaving the factory and before being delivered to the client, or when the client has gone on holiday and this vehicle is thus left in the garage. In this case the voltage is so low that the computers are no longer able to quit the standby mode. The vehicle then cannot be set in motion again, even if it has a fully charged high-voltage battery.

The object of the invention is therefore to provide a power supply system and method for an electric vehicle making it possible to extend the possible storage period whilst avoiding the above-described breakdown.

DESCRIPTION OF THE INVENTION

In view of these objectives, the invention relates to an electric power supply system for an electric vehicle, the system comprising a low-voltage network for powering the auxiliary devices of the vehicle and a high-voltage network for powering the propulsion means of the vehicle, the low-voltage network comprising a low-voltage battery for storing electric energy and a first converter connected to the high-voltage network for powering the low-voltage network, the high-voltage network comprising a high-voltage battery and switching means for isolating the high-voltage battery, the system further comprising a first supervisor for actuating the switching means, the system being characterized in that it also comprises first monitoring means for determining if the charge of the low-voltage battery is below or above a first threshold, the first supervisor being arranged to control the switching means in order to connect the high-voltage battery if the first monitoring means indicate that the charge of the low-voltage battery is below the first threshold.

When the switching means establish the connection between the battery and the high-voltage network, the first converter is powered and thus allows the low-voltage battery to be recharged. The reserve of the high-voltage battery is then used to extend the autonomy of the low-voltage battery. The possible storage period of the vehicle without risk of breakdown is very significantly increased so as to cover the majority of circumstances. The period of autonomy thus typically lasts from a number of weeks to a period of a number of months.

In particular, the supervisor comprises a dormant mode, in which it only performs a wake-up function, and an awake mode, in which it performs multiple functions, the supervisor being arranged to transition from the dormant mode to the awake mode cyclically and to monitor the charge of the low-voltage battery and to return to the dormant mode after the check. Checks are thus provided at regular intervals, such that the supervisor remains for the majority of the time in the dormant mode and thus has minimal electrical consumption. The autonomy is increased as a result.

In a complementary manner, the system comprises a second converter comprising means for connection to an external power supply network for powering the high-voltage network. The second converter allows normal charging of the two batteries simultaneously by powering the high-voltage network.

In accordance with an improvement, the system comprises signaling means for signaling that the switching means are connecting the high-voltage battery to the high-voltage network. A user of the vehicle or a person tasked with the maintenance thereof is thus aware of the potential electrical risk across the high-voltage circuit.

The invention also relates to a method for controlling an electric power supply system for an electric vehicle, the system comprising a low-voltage network for powering the auxiliary devices of the vehicle and a high-voltage network for powering the propulsion means of the vehicle, the low-voltage network comprising a low-voltage battery for storing electrical energy and a first converter connected to the high-voltage network for powering the low-voltage network, the high-voltage network comprising a high-voltage battery, and switching means for isolating the high-voltage battery, the method being characterized in that the switching means are controlled if it is determined that the charge of the low-voltage battery is below a first threshold so as to connect the high-voltage battery.

In accordance with further features:
- the charge of the low-voltage battery is checked cyclically by transitioning the vehicle from a dormant mode, in which only a wake-up function is performed, into an awake mode.
- for a power supply system also comprising a second converter comprising means for connection to an external power supply network for powering the high-voltage network, if the second converter is connected to the external network, the second converter is also switched at the same time as the switching means in order to power the high-voltage network. The second converter is generally configured to stop once the batteries have been charged. The means for reactivating the power supply by the home network if this remains connected to the vehicle are thus provided here. The charge of the high-voltage battery is thus preserved.

the switching means are prevented from being connected if the charge of the high-voltage battery is below a second threshold. A residual charge is thus preserved in the high-voltage battery.

BRIEF DESCRIPTION OF THE FIGURE

The invention will be better understood and further details and advantages will become clear upon reading the following description, said description being given with reference to the sole FIGURE, which shows a schematic diagram of a vehicle comprising a system according to the invention.

DETAILED DESCRIPTION

The sole FIGURE shows an electric vehicle 1 comprising propulsion means (not shown) powered by electric energy. The vehicle 1 comprises connection means 1240 to be connected to an external home network able to provide electricity, for example in the form of alternating current at a voltage of 230 V. Electricity provided by the home network is stored in batteries (detailed hereinafter) in order to power in particular the propulsion means without the vehicle 1 being connected to the home network.

The vehicle 1 comprises an electric power supply system. This is composed basically of a low-voltage network 10 for powering the auxiliary devices 11 of the vehicle 1 and of a high-voltage network 12 for powering the propulsion means. The low-voltage network 10 comprises a low-voltage battery 100 for storing electric energy and a first converter 102 connected to the high-voltage network 12 for powering the low-voltage network 10. The low-voltage battery 100 makes it possible to deliver for example a voltage of 12 V. The high-voltage network 12 comprises a high-voltage battery 120 and switching means 122 for isolating the high-voltage battery 120.

The electric power supply system also comprises a first supervisor 14 for actuating the switching means 122.

The high-voltage network 12 also comprises a second converter 124 which comprises means 1240 for connection to the external power supply network and which is arranged to power the high-voltage network 12. It provides, for example, a direct voltage of 400 V. It also comprises a second supervisor 16 arranged to control the second converter 124.

The electric power supply system also comprises first monitoring means 17 in the form of a voltage sensor, making it possible to determine a warning concerning a level of charge of the low-voltage battery 100. The first monitoring means 17 are connected to the first supervisor 14.

The electric power supply system also comprises second monitoring means 18 making it possible to determine a warning concerning a level of charge of the high-voltage battery 120. The second monitoring means 18 are connected to the second supervisor 16.

The electric power supply system also comprises signaling means 19 controlled by the first supervisor 14 and arranged to transmit information concerning the state of the vehicle 1. The signaling means may be a visual warning device generating a steady or flashing light, arranged on the instrument panel of the vehicle, outside the vehicle, or in the engine compartment, or may be an audible alarm.

Operation

The second supervisor 16 is configured to control the charge of the high-voltage battery 120. For this, it detects the connection of the external home network and controls the converter such that said converter provides the high direct voltage across the high-voltage network 12. The second supervisor 16 receives information from the second monitoring means 18 so as to determine the moment at which the high-voltage battery 120 is charged. The second converter 124 is then controlled so as to stop the power supply of the high-voltage network 12.

The first supervisor 14 comprises a dormant mode in which it only performs a wake-up function and an awake mode in which it performs multiple functions. The transition from the dormant mode to the awake mode is controlled typically by the user when the user wishes to use the vehicle 1, for example by engaging an ignition key. Likewise, the transition from the awake mode to the dormant mode is controlled by the disengagement of the ignition key, after a potential time delay. The first supervisor 14 is arranged to transition also from the dormant mode to the awake mode cyclically, in order to monitor the charge of the low-voltage battery 100 thanks to the first monitoring means 17, and to return to the dormant mode after the check. The first monitoring means 17 provide directly a level of voltage, from which the first supervisor 14 deduces a level of charge of the low-voltage battery 100. This level of charge is then compared to a first threshold. If the charge of the low-voltage battery 100 is below the first threshold, the first supervisor 14 determines that the low-voltage battery 100 must be recharged. The first supervisor 14 then controls the switching means 122 to connect the high-voltage battery 120 to the high-voltage network 12. The first converter 102 is then powered and thus provides direct current to the low-voltage network 10 so as to recharge the low-voltage battery 100. At the same time, the first supervisor 14 controls the signaling means 19 in order to inform the users of the vehicle 1 that the high-voltage network 12 is being powered.

If the second converter 124 is connected to the external network, the first supervisor 14 sends a request to the second supervisor 16 in order for the second supervisor to switch the second converter 124 so as to power the high-voltage network 12.

In accordance with an optional arrangement, the first supervisor receives information from the second monitoring means 18 directly or via the second supervisor 16 in order to warn when the charge of the high-voltage battery 120 is below a second threshold. In this case the first supervisor 14 does not control the connection of the switching means 122, so as to preserve a minimal level of charge of the high-voltage battery 120.

In accordance with another optional arrangement, the switching means 122 are only connected if the home network is connected.

The invention claimed is:

1. An electric power supply system for an electric vehicle, the system comprising:
   a low-voltage network configured to power auxiliary devices of the vehicle;
   a high-voltage network configured to power propulsion of the vehicle,
   wherein
      the low-voltage network includes a low-voltage battery configured to store electric energy and a first converter connected to the high-voltage network and configured to power the low-voltage network, and the high-voltage network includes a high-voltage battery and switching means for isolating the high-voltage battery, the system further comprising:

a first supervisor configured to actuate the switching means; and a sensor configured to determine if a charge of the low-voltage battery is below or above a first threshold, wherein the first supervisor controls the switching means to connect the high-voltage battery if the sensor indicates that the charge of the low-voltage battery is below the first threshold, the first supervisor including a dormant mode in which the first supervisor performs a wake-up function and an awake mode, in which the first supervisor monitors the charge of the low-voltage battery, the awake mode being activated in response to engagement of ignition of the electric vehicle, the system further comprising:

signaling electronics configured to signal that the high-voltage battery is being powered.

2. The system as claimed in claim 1, wherein the first supervisor is further configured to transition from the dormant mode to the awake mode cyclically, to monitor the charge of the low-voltage battery and to return to the dormant mode after a check.

3. The system as claimed in claim 1, further comprising: a second converter connected to an external power supply network for powering the high-voltage network.

4. The system as claimed in claim 1, wherein the signaling electronics are configured to signal that the high-voltage battery is being powered when the high-voltage battery is being connected to the high-voltage network as a result of the low-voltage battery being below a first threshold.

5. The system as claimed in claim 1, wherein the first supervisor transitions to the dormant mode in response to disengagement of ignition of the electric vehicle.

6. A method for controlling an electric power supply system for an electric vehicle, the system including: a low-voltage network configured to power auxiliary devices of the vehicle, a high-voltage network configured to power propulsion of the vehicle, the low-voltage network including a low-voltage battery configured to store electrical energy and a first converter connected to the high-voltage network and configured to power the low-voltage network, the high-voltage network including a high-voltage battery the method comprising:

connecting the high-voltage battery if it is determined by a first supervisor monitoring a sensor that a charge of the low-voltage battery is below a first threshold, the first supervisor including a dormant mode in which the first supervisor performs a wake-up function and an awake mode, in which the first supervisor monitors the charge of the low-voltage battery, the awake mode being activated in response to engagement of ignition of the electric vehicle; and signaling, via signaling electronics, that the high-voltage battery is being powered.

7. The method as claimed in claim 6, further comprising: cyclically checking the charge of the low-voltage battery while transitioning the vehicle from the dormant mode, in which only a wake-up function is performed, into the awake mode when the charge of the low-voltage battery is below the first threshold.

8. The control method as claimed in claim 6, wherein if a second converter of the electric power supply system configured to connect to an external power supply network for powering the high voltage network is connected to the external network, the second converter is also switched at a same time as the switching means to power the high-voltage network.

9. The control method as claimed in claim 6, further comprising:

preventing the switching means from being connected if the charge of the high-voltage battery is below a second threshold.

* * * * *